May 12, 1964 W. ROTH 3,132,512
GYROSCOPIC MASS FLOWMETER
Filed Feb. 13, 1961 3 Sheets-Sheet 1

INVENTOR
Wilfred Roth
BY
ATTORNEYS

May 12, 1964 W. ROTH 3,132,512
GYROSCOPIC MASS FLOWMETER
Filed Feb. 13, 1961 3 Sheets-Sheet 2

INVENTOR
Wilfred Roth
BY
ATTORNEYS

INVENTOR
Wilfred Roth
BY
ATTORNEYS

United States Patent Office 3,132,512
Patented May 12, 1964

3,132,512
GYROSCOPIC MASS FLOWMETER
Wilfred Roth, 58 Brainard Road, West Hartford, Conn.
Filed Feb. 13, 1961, Ser. No. 88,805
7 Claims. (Cl. 73—194)

This invention relates to gyroscopic mass flowmeters of the oscillating or A.-C. type, and particularly to arrangements for leading fluid to and from the loop conduit without impairing measurement accuracy.

In a gyroscopic mass flowmeter of the A.-C. type, a fluid conduit loop is mounted for oscillation about drive and torque axes. These axes are advantageously perpendicular to each other. Inlet and outlet conduit sections are provided to lead fluid to and from the loop. By oscillating the loop about the drive axis, a torque is produced about the torque axis due to gyroscopic couples when fluid flows in the loop. These gyroscopic couples, and hence the torque, vary with the mass flow of the fluid. Indicating means are provided which respond to movement of the loop about the torque axis. The indicating means may include one or more transducers arranged to respond to the amplitude, velocity, acceleration, etc. of the loop oscillation.

In U.S. Patent 2,865,201, issued December 23, 1958, to Roth for "Gyroscopic Mass Flowmeter," flowmeters of the oscillating or A.-C. type are described, and the principles of operation explained in considerable detail. The oscillating type avoids the necessity of employing rotary joints, with their incumbent disadvantages. However, inasmuch as the flowmeter will commonly be inserted in a fluid conduit, such as a pipe line, it is necessary to provide resilient or flexible couplings to the loop, so as to allow the loop to oscillate about the drive and torque axes.

Fluid flow must often be measured under conditions of high pressure and temperature, and the fluid may be corrosive or otherwise chemically active. Also, when the flowmeter is used in an installation where an interruption of fluid flow would be serious, the conduits in the flowmeter must be designed to insure that the flowmeter will not cause such an interruption even under adverse environmental conditions.

Accordingly, the flexible couplings must be rugged and durable. Bellows have been found satisfactory in these respects, and other types of flexible tubular conduits may also be satisfactory for many purposes.

In use, the flexible conduits will be subjected to both bending and twisting, or bending in two directions, since the loop conduit must be allowed to oscillate about mutually perpendicular axes. With flexible conduits of adequate ruggedness and durability, it has been found that the arrangement of the conduits is important in order to obtain high measuring accuracy. Bending in two directions has been found subject to the disadvantage that bending about the drive axis affects the bending about the torque axis, thus introducing a source of error. On the other hand, bending and twisting also have a mutual interaction.

In accordance with the present invention the tubular flexible conduit sections are so arranged that, although both bending and twisting are involved, inaccuracies due to interaction between the two motions are largely avoided. To this end, the flexible sections are arranged to extend substantially perpendicular to the drive axis and substantially parallel to the torque axis. Advantageously the flexible sections are arranged on opposite sides of the torque axis and the ends of each section are on opposite sides of the drive axis, a symmetrical arrangement in the plane of the loop being preferred.

With this arrangement it is found that the bending of the flexible sections about the drive axis does not significantly affect the twisting about the torque axis, under normal operating conditions, and hence does not materially affect movement of the loop due to gyroscopic couples produced by fluid flow. On the other hand, although the flexible sections resist the twisting about the torque axis, this may be considered as introducing a torsional restoring force supplementing that provided by the torque axis mounting means, and treated accordingly in the overall instrument design.

In operation the temperature of the fluid being measured may change and, since the metal of which the inlet and outlet conduit sections are made will commonly have a temperature coefficient of expansion, resultant stresses may adversely affect the measuring accuracy. In accordance with a further feature of the invention, the inlet and outlet conduit sections are rigidly attached to the support frame near the ends thereof toward the flexible sections, but the outer ends leading to the external conduit are supported in slidable, fluid-tight manner. Thus as the inlet and outlet sections expand and contract, the slidable mounting prevents building up of stresses which would distort the loop conduit or affect its motion.

The invention will be described in connection with a specific embodiment shown in the accompanying drawings, in which.

Figure 2:
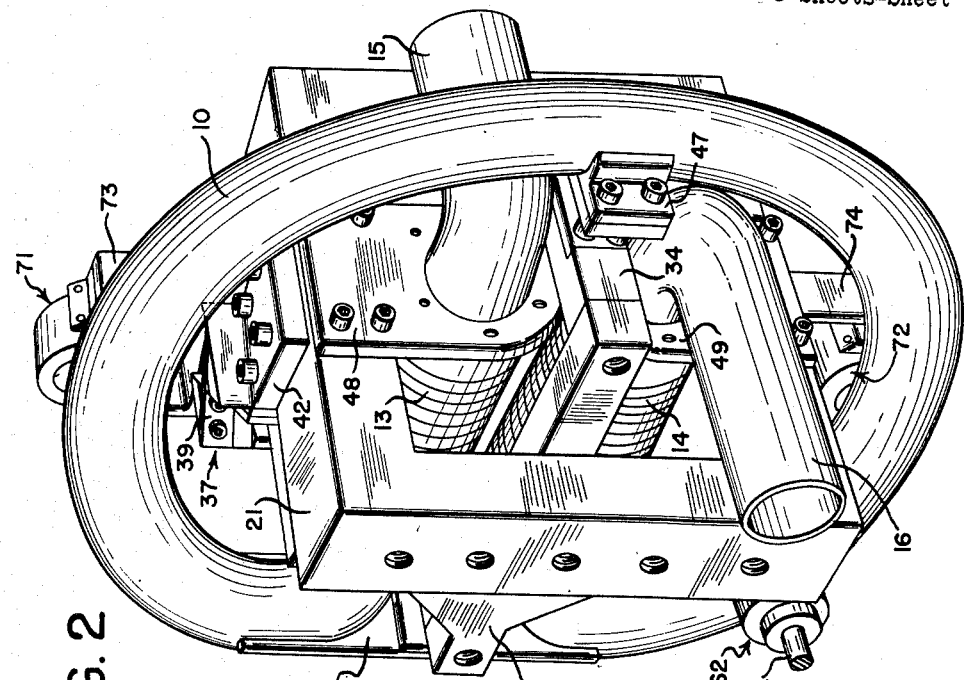
FIGS. 1 and 2 are perspective drawings from opposite sides of the gyroscopic mass flowmeter, with the end plates and cover removed.
Figure 1:
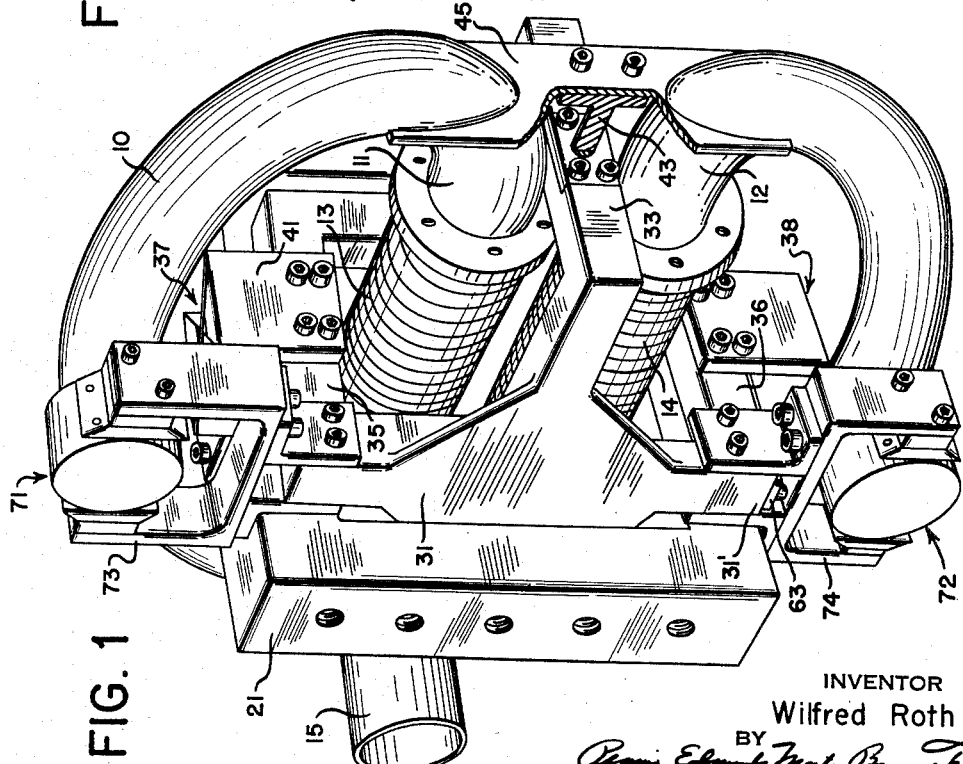

Referring to the drawings, a fluid conduit loop 10 is shown in the form of a pipe bent into a circular loop. If desired the pipe may be bent to form a rectangular or other shaped loop. The ends 11 and 12 of the loop conduit are bent inwards of the loop in the plane thereof, and are attached to respective flexible tubular conduit sections here shown as bellows 13, 14. Inlet and outlet fluid conduit sections 15, 16 are provided, and here take the form of right-angle pipe elbows. The inner ends of the elbows are attached to bellows 13, 14, respectively. The outer ends extend in opposite directions from the plane of the loop, thereby facilitating connecting the flowmeter in a pipe line. As will be understood, either of sections 15, 16 may serve as the inlet conduit and the other as the outlet conduit. For convenience section 15 will here be considered to be the inlet.

Figure 3:
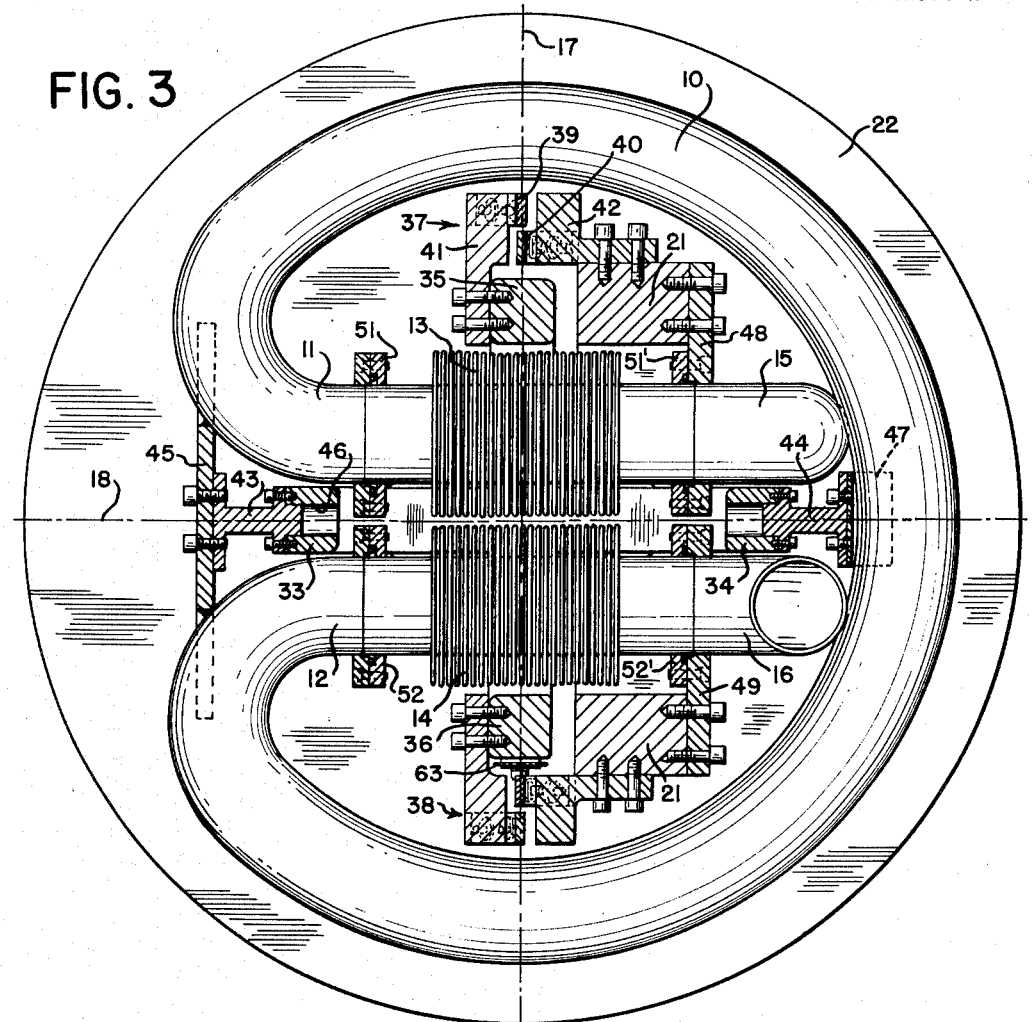
FIG. 3 is a vertical cross-section in the plane of the loop, taken along the line 3—3 of FIG. 5.
Figure 4:
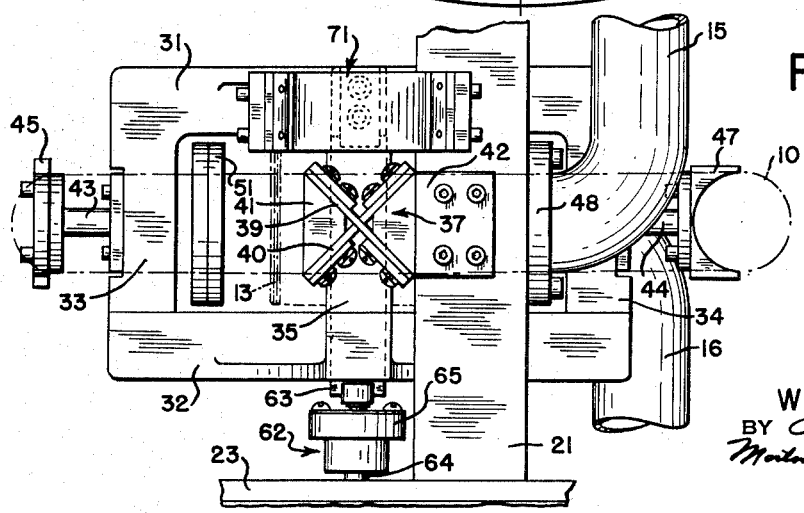
FIG. 4 is a detail showing the crossed flexor mounting arrangement for movement about the drive axis.

The loop 10 is mounted for oscillation about drive and torque axes 17, 18, respectively (FIG. 3). In the embodiment specifically shown, the drive axis is vertical and the torque axis horizontal. The mounting means for oscillation about the drive axis will be described first.

A support frame is provided comprising an open rectangular member 21 to which end plates 22 and 23 (FIG. 5) are bolted. A cylindrical cover 24 encircles end plates 22 and 23 and is sealed in place by sealing rings 25, 25'. Flanges 26 and 27 (FIG. 5) are bolted to end plates 22 and 23 so that external pipes may be connected thereto. This embodiment is designed to be supported by the external pipes, and consequently no base is shown. However, a base may be provided for mounting the flowmeter independently of the external connections.

The rectangular frame member 21 extends through the loop and may conveniently be made in two pieces (not shown) to facilitate assembly. An oscillating frame is mounted on the frame member 21 for oscillation about a drive axis with respect thereto. The oscillating frame comprises end members 31 and 32, joined together by transverse legs 33, 34, 35 and 36 to form a rigid structure.

The oscillating frame is mounted for oscillation about the stationary support frame by means of a pair of crossed flexor mountings 37 and 38. The upper flexor mounting 37 includes two flexing members 39 and 40 which are substantially perpendicular to each other and vertically separated. Opposite ends of flexing members 39, 40 are attached to brackets 41, 42 which in turn are bolted, respectively, to transverse leg 35 of the oscillating frame and to frame member 21 of the stationary frame. The lower flexor mounting 38 is similar.

By using the crossed flexing members for mounting the oscillating frame on the support frame, any play or looseness in the coupling is avoided. Inasmuch as the amplitude of oscillation is very small, only slight flexing of members 39 and 40 is required, and they may be made quite stiff so as to provide a strong support while at the same time allowing rotation through small angles.

The loop 10 is mounted on the oscillating frame for oscillation about a torque axis with respect thereto. Torsion rods 43 and 44 are employed for the purpose. A flange on the outer end of torsion rod 43 is bolted to a plate 45 which is welded or otherwise attached to the loop 10. A flange on the inner end is bolted to transverse leg 33 of the oscillating frame. As shown in FIG. 3, a hole 46 is drilled in leg 33 so that the end of the torsion rod can be precisely located therein. A flange on the outer end of torsion rod 44 is bolted to a plate 47 which in turn is welded or otherwise attached to loop 10. A flange on the inner end is bolted to transverse leg 34 of the oscillating frame.

By the use of torsion rods for supporting the loop, the torque axis is precisely defined and the torsion rods provide a restoring force urging the loop to a neutral position, which is here a vertical plane.

The inner ends of inlet and outlet conduit sections 15 and 16 are provided with flange plates 48 and 49 which are bolted to the stationary frame member 21. The bellows 13 and 14 are provided with flanges 51, 51' and 52, 52', respectively. Flanges 51, 52 are attached to cooperating flanges on the ends 11 and 12 of loop 10, as by bolting. Flanges 51', 52' are attached to flange plates 48 and 49 of the inlet and outlet conduits, as by bolting.

Figure 5:
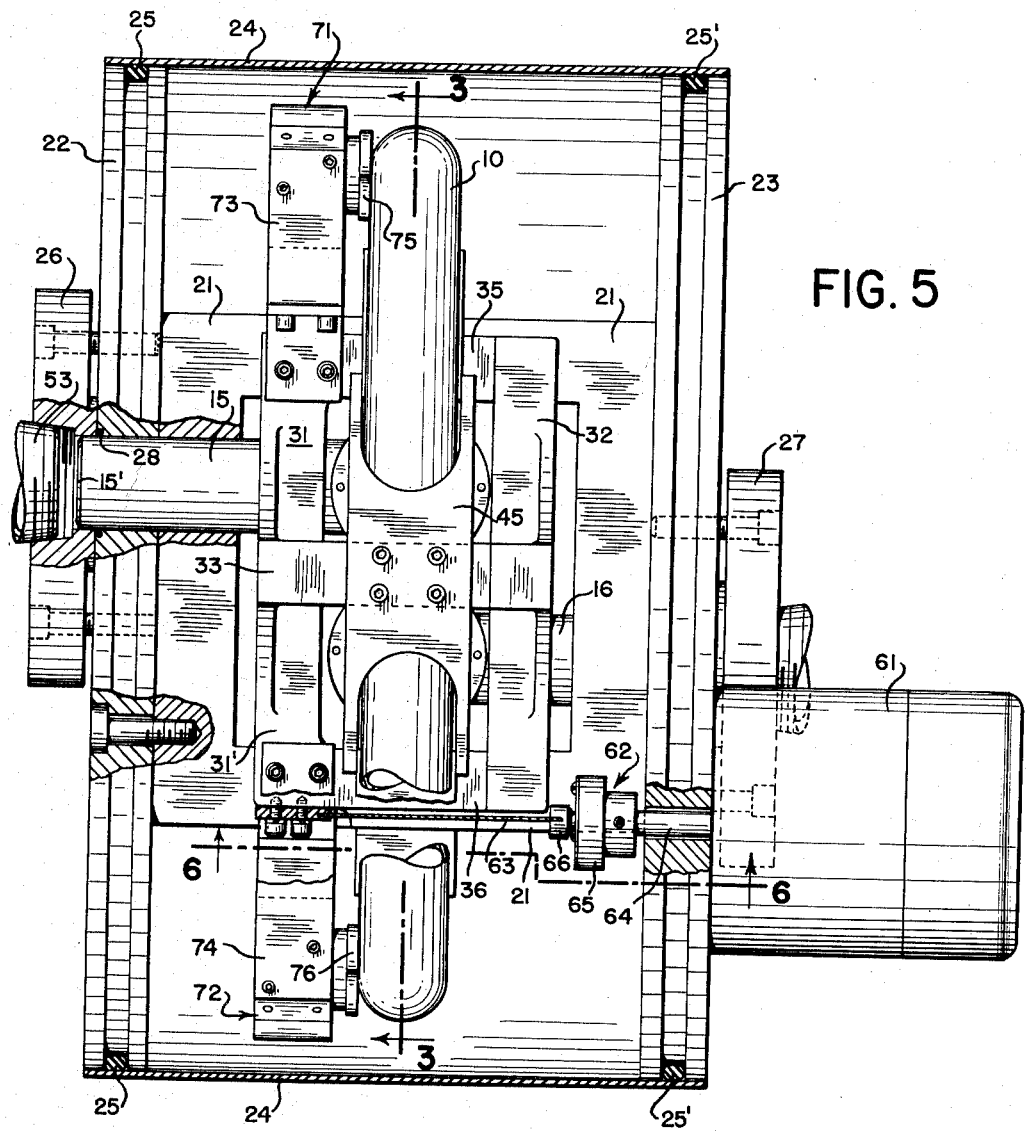
FIG. 5 is an elevation taken from the left side of FIG. 3, with certain portions broken away to show the internal structure.
Figure 6:
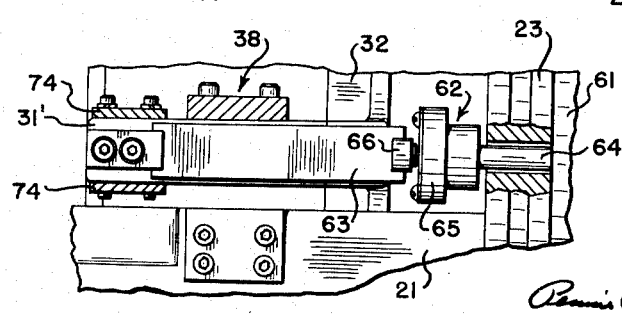
FIG. 6 is a cross-section along the line 6—6 of FIG. 5, showing the drive mechanism.

As seen in FIG. 5, the outer end of inlet conduit section 15 passes through a bore in end plate 22. The bore diameter is selected to provide a snug fit with conduit section 15, but to allow a slight longitudinal movement thereof if required due to temperature changes. Sealing ring 28 fits in a groove in end plate 22, and is compressed thereon by flange 26 so as to provide a fluid-tight connection while allowing the longitudinal movement of 15.

Flange 26 is bolted to end plate 22 and is provided with a tapered pipe thread for connection with an external pipe 53. The tapered thread is made so that the end 15' of inlet section 15 will not abut the end of the external pipe 53 when the latter is threaded in place. Thus movement of the end of pipe 53 as a result of temperature changes is not prevented by contact with the external pipe.

Flange 27 for outlet conduit section 16 is similar to flange 26 and is bolted to end plate 23.

The oscillating frame is driven about the drive axis by a motor 61, an eccentric coupling 62 and a flat spring 63. The motor 61 is mounted on end plate 23 and the shaft 64 extends therethrough. The eccentric coupling 62 includes a fitting 65 attached to motor shaft 64, and a ball bearing eccentrically mounted therein. The outer end of spring 63 is attached to a fitting 66 which is inserted in the inner race of the ball bearing. Thus, as the motor The inner end of spring 63 is attached to the lower end 31' of end member 31 of the oscillating frame. The width of the spring is perpendicular to the drive axis. Thus, as the outer end of the spring moves circularly, the oscillating frame is oscillated about the drive axis since the spring cannot bend in that direction. However, the spring can flex vertically to accommodate the circular motion. The point of attachment of the spring to the oscillating frame is on the other side of the drive axis with respect to the eccentric coupling 62, so that the inner race of the bearing is not forced to move in the axial direction with respect to motor shaft 64.

This drive mechanism is described in detail in copending application Serial No. 88,806, filed concurrently herewith by Paul D. Henderson for "Gyroscopic Mass Flowmeter," and further description here is unnecessary. The mechanism is advantageous in providing a precise amplitude of oscillation about the drive axis without undesirable play which would affect the precision of measuring mass flow.

The oscillation of loop 10 about the drive axis produces oscillation of the loop about the torque axis varying with fluid flow in the loop. Transducers 71 and 72 are provided for sensing the oscillation about the torque axis. The housings of the transducers are mounted in brackets 73 and 74 attached to the end plate 31 of the oscillating frame. The cooperating movable members of the transducers (75, 76 in FIG. 5) are attached to the loop 10 so that movement of the loop is sensed by the transducers. They may be of the moving coil type described in Patent 2,865,201, supra, and may be connected in series-aiding with the outputs supplied to suitable instrumentation for indicating mass flow. The details of the transducers form no part of the present invention and hence they need not be described further.

Returning to the arrangement of the bellows for coupling inlet and outlet pipe conduit sections to the loop conduit, it will be noted that the bellows extend substantially perpendicular to the drive axis and substantially parallel to the torque axis. Thus, as the loop oscillates about the drive axis, the ends of the bellows which are connected to the loop ends 11 and 12 move through a small angle in a plane perpendicular to the drive axis. The spacing of the convolutions of the bellows changes to allow this movement, without requiring any torsional movement between the ends.

As the loop oscillates about the torque axis, flanges 51 and 52 (FIG. 3) move through small angles with respect to the torque axis 18, whereas flanges 51' and 52' are stationary. This results in a slight torsional twisting of the bellows. However, the bending about the drive axis does not significantly affect this twisting, and hence does not significantly impair the accuracy of measurement of mass flow.

As the fluid temperature changes, the slidable mounting of the outer ends of inlet and outlet pipes 15, 16 allows the pipes to expand and contract without producing stresses on the inner ends attached to fixed flange plates 48, 49, and avoiding any stresses on the adjacent ends of the bellows or on the frame which might produce distortions affecting the accuracy of measurement.

The invention has been described in connection with a specific embodiment thereof. It will be understood that modifications may be made by those skilled in the art within the spirit and scope of the invention.

I claim:

1. A gyroscopic mass flowmeter which comprises a stationary support means, a frame mounted on said support means for oscillation relative to the support means about a drive axis, a fluid conduit loop mounted on said frame for oscillation relative to the frame about a torque axis, said torque axis being substantially perpendicular to said drive axis, rigid inlet and outlet fluid conduit sections substantially fixedly mounted on said stationary support means with the inner ends thereof substantially in the plane of the loop, a pair of flexible tubular conduit sections connecting said inner ends of the inlet and outlet fluid conduit sections with said fluid conduit loop respectively, said flexible sections extending substantially perpendicular to said drive axis and substantially parallel to said torque axis, respective flexible sections being on opposite sides of the torque axis and the ends of each section being on opposite sides of the drive axis, and driving means for oscillating said frame about said drive axis to produce oscillations of said loop about said torque axis which vary with fluid flow in the loop.

2. A gyroscopic mass flowmeter which comprises a stationary support means, a frame mounted on said support means for oscillation relative to the support means about a drive axis, a fluid conduit loop mounted on said frame for oscillation relative to the frame about a torque axis, said drive and torque axes being approximately in the plane of the loop and substantially perpendicular to each other, the ends of the conduit forming said loop extending inwards of the loop, rigid inlet and outlet fluid conduit sections substantially fixedly mounted on said stationary support means with the inner ends thereof substantially in the plane of the loop, a pair of flexible tubular conduit sections connecting said inner ends of the inlet and outlet fluid conduit sections with said ends of the loop conduit respectively, said flexible sections extending substantially perpendicular to said drive axis and substantially parallel to said torque axis, respective flexible sections being on opposite sides of the torque axis and the ends of each section being on opposite sides of the drive axis, and driving means for oscillating said frame about said drive axis to produce oscillations of said loop about said torque axis which vary with fluid flow in the loop.

3. A gyroscopic mass flowmeter which comprises a stationary support means, a frame mounted on said support means for oscillation relative to the support means about a drive axis, a fluid conduit loop mounted on said frame for oscillation relative to the frame about a torque axis, said drive and torque axes being approximately in the plane of the loop and substantially perpendicular to each other, the ends of the conduit forming said loop extending inwards of the loop, rigid inlet and outlet fluid conduit sections substantially fixedly mounted on said stationary support means with the inner ends thereof substantially in the plane of the loop, a pair of bellows connecting said inner ends of the inlet and outlet fluid conduit sections with said ends of the loop conduit respectively, said bellows lying approximately in the plane of the loop and extending substantially perpendicular to said drive axis and substantially parallel to said torque axis, respective bellows being on opposite sides of the torque axis and the ends of each bellows being on opposite sides of the drive axis, and driving means for oscillating said frame about said drive axis to produce oscillations of said loop about said torque axis which vary with fluid flow in the loop.

4. A gyroscopic mass flowmeter which comprises a stationary support means, a frame mounted on said support means for oscillation relative to the support means about a drive axis, a fluid conduit loop mounted on said frame for oscillation relative to the frame about a torque axis, said drive and torque axes being approximately in the plane of the loop and substantially perpendicular to each other, the ends of the conduit forming said loop extending inwards of the loop, rigid inlet and outlet fluid conduit sections in the form of substantially right angle elbows having inner ends substantially in the plane of said loop and outer ends extending in opposite directions from the plane of the loop, means for substantially rigidly attaching said inlet and outlet fluid conduit sections to said stationary support means adjacent said inner ends thereof, a pair of bellows connecting said inner ends with said ends of the loop conduit respectively, said bellows lying approximately in the plane of the loop and extending substantially perpendicular to said drive axis and substantially parallel to said torque axis, respective bellows being on opposite sides of the torque axis and the ends of each bellows being on opposite sides of the drive axis, and driving means for oscillating said frame about said drive axis to produce oscillations of said loop about said torque axis which vary with fluid flow in the loop.

5. A gyroscopic mass flowmeter which comprises a stationary support means, a frame mounted on said support means for oscillation relative to the support means about a drive axis, a fluid conduit loop mounted on said frame for oscillation relative to the frame about a torque axis, said drive and torque axes being approximately in the plane of the loop and substantially perpendicular to each other, the ends of the conduit forming said loop extending inwards of the loop from adjacent portions thereof, rigid inlet and outlet fluid conduit sections in the form of substantially right angle elbows having inner ends substantially in the plane of said loop and outer ends extending in opposite directions from the plane of the loop, means for substantially rigidly attaching said inlet and outlet fluid conduit sections to said stationary support means adjacent said inner ends thereof, a pair of bellows connecting said inner ends with said ends of the loop conduit respectively, said bellows lying approximately in the plane of the loop and extending substantially perpendicular to said drive axis and substantially parallel to said torque axis, said pair of bellows being substantially symmetrically positioned on opposite sides of the torque axis with the ends of each bellows substantially symmetrically positioned on opposite sides of the drive axis, and driving means for oscillating said frame about said drive axis to produce oscillations of said loop about said torque axis which vary with fluid flow in the loop.

6. A gyroscopic mass flowmeter which comprises a support frame, a second frame mounted on said support frame for oscillation about a drive axis with respect thereto, a fluid conduit loop, means for mounting said loop on said second frame for oscillation about a torque axis with respect thereto, said torque axis being substantially perpendicular to said drive axis, inlet and outlet fluid conduit sections, a pair of flexible tubular conduit sections connecting one end of said inlet and outlet fluid conduit sections with said fluid conduit loop respectively, said flexible sections extending substantially perpendicular to said drive axis and substantially parallel to said torque axis, means for substantially rigidly attaching said inlet and outlet conduit sections to said support frame near the ends thereof connected to respective flexible sections with said ends substantially in the plane of the loop, coupling means mounted on said support frame for attaching the flowmeter to external fluid conduits, means for supporting the other ends of said inlet and outlet conduit sections adjacent said coupling means and in slidable fluid-tight relationship therewith, and driving means for oscillating said second frame about said drive axis to produce oscillations of said loop about said torque axis which vary with fluid flow in the loop.

7. A gyroscopic mass flowmeter which comprises a support frame, a second frame mounted on said support frame for oscillation about a drive axis with respect thereto, a fluid conduit loop, means for mounting said loop on said second frame for oscillation about a torque axis with respect thereto, said drive and torque axes being approximately in the plane of the loop and substantially perpendicular to each other, the ends of the conduit forming said loop extending inwards of the loop from adjacent portions thereof, inlet and outlet fluid conduit sections in the form of substantially right angle elbows having inner ends substantially in the plane of said loop and outer ends extending in opposite directions from the plane of the loop, means for substantially rigidly attaching said inlet and outlet fluid conduit sections to said support frame adjacent said inner ends thereof, a pair of bellows connecting said inner ends with said ends of the loop conduit respectively, said bellows lying approximately in the plane of the loop and extending substantially perpendicular to said drive axis and substantially parallel to said torque axis, said pair of bellows being substantially symmetrically positioned on opposite sides of the torque axis with the ends of each bellows substantially symmetrically positioned on opposite sides of the drive axis, a pair of coupling means mounted on said support frame adjacent said outer ends of the inlet and outlet conduit sections for attaching the flowmeter to external fluid conduits, means for supporting said outer ends in longitudinally-slidable fluid-tight relationship with said coupling means respectively, and driving means for oscillating said second frame about said drive axis to produce oscillations of said loop about said torque axis which vary with fluid flow in the loop.

References Cited in the file of this patent

UNITED STATES PATENTS

| | | |
|---|---|---|
| 2,831,349 | Altfillisch et al. | Apr. 22, 1958 |
| 2,865,201 | Roth | Dec. 23, 1958 |

UNITED STATES PATENT OFFICE
CERTIFICATE OF CORRECTION

Patent No. 3,132,512 May 12, 1964

Wilfred Roth

It is hereby certified that error appears in the above numbered patent requiring correction and that the said Letters Patent should read as corrected below.

Column 3, line 72, after "motor" insert -- rotates the eccentric coupling 62, the outer end of spring 63 moves circularly about the axis of motor shaft 64. --.

Signed and sealed this 8th day of September 1964.

(SEAL)
Attest:

ERNEST W. SWIDER
Attesting Officer

EDWARD J. BRENNER
Commissioner of Patents